Figure 8:
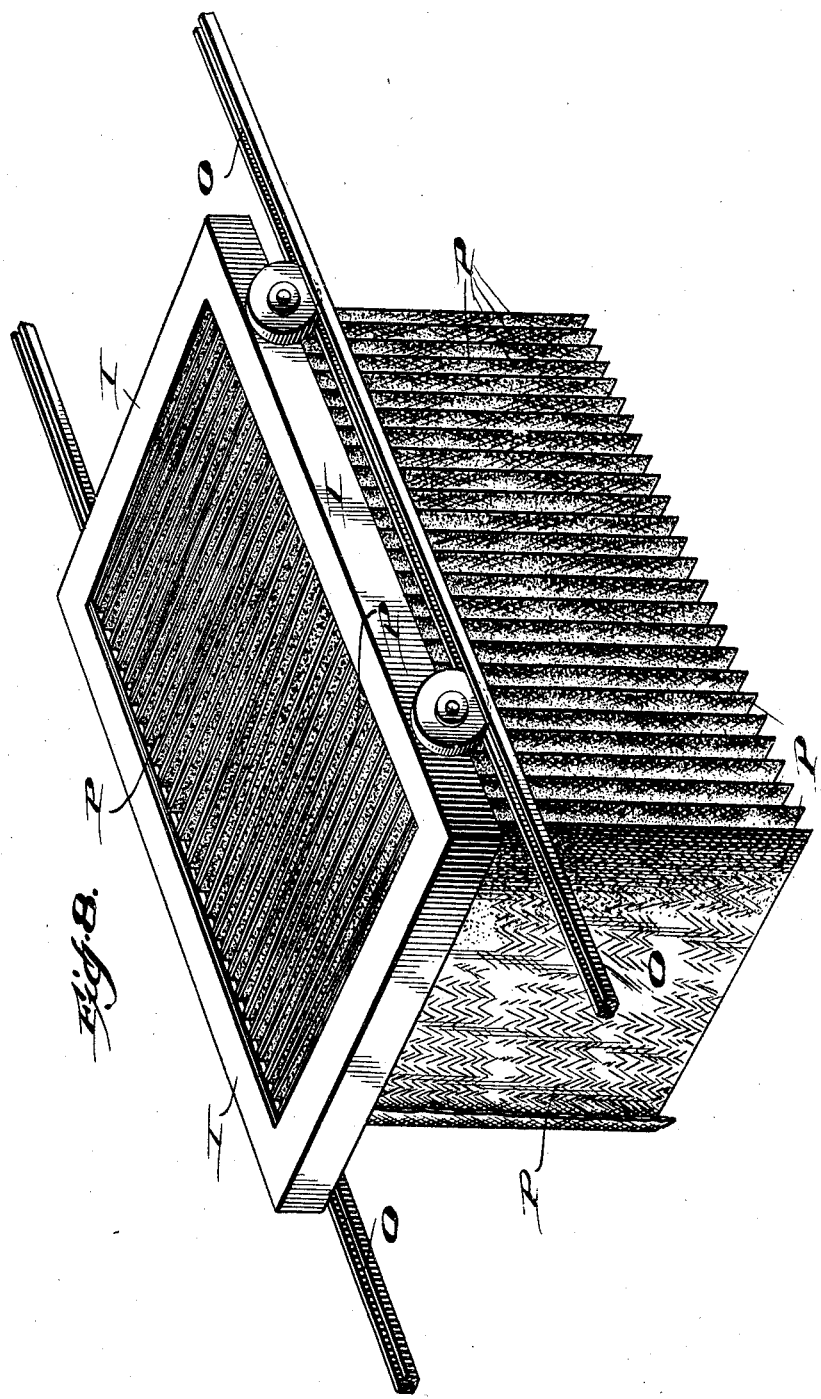

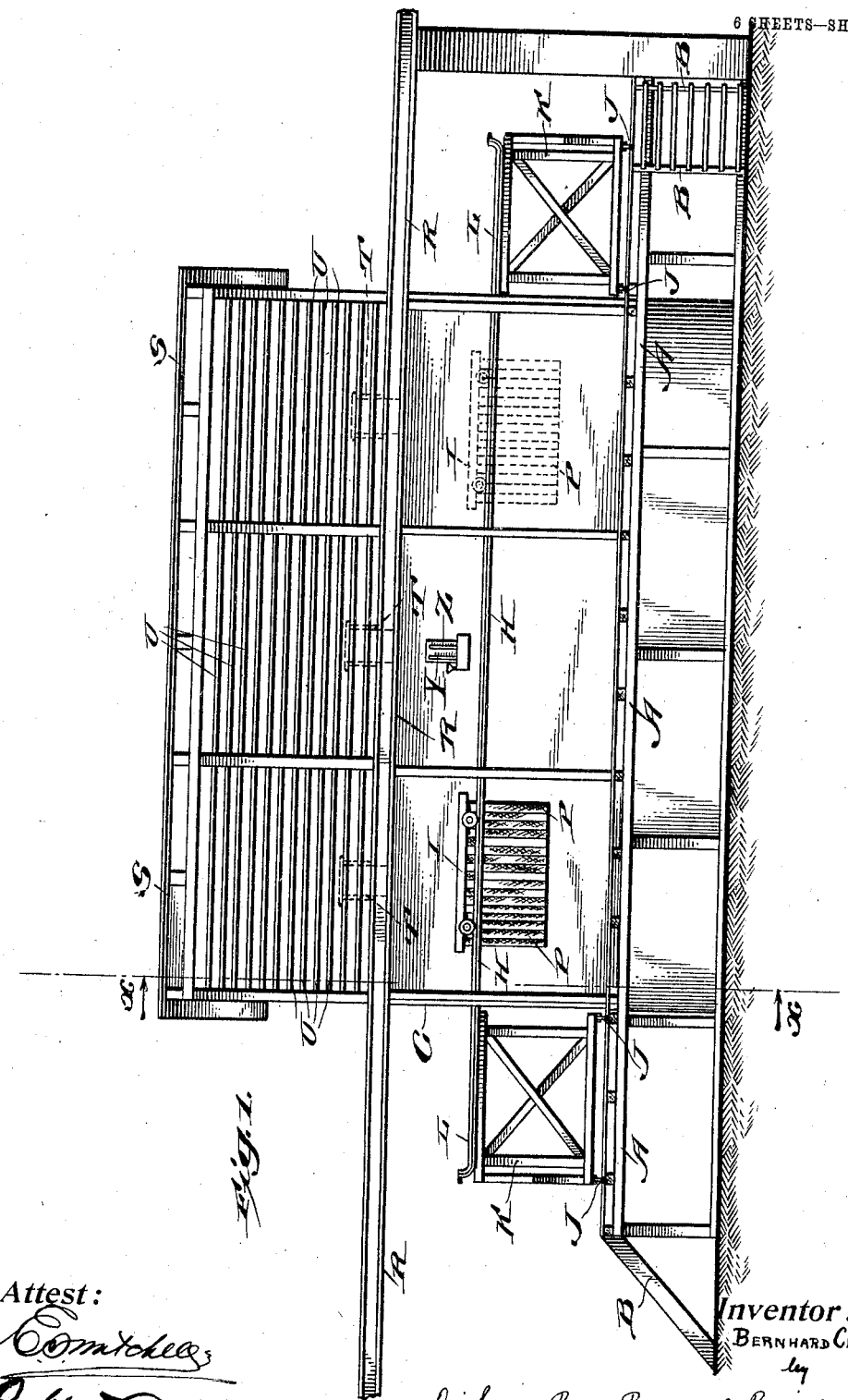

No. 810,394. PATENTED JAN. 23, 1906.
B. CLEFF.
PROCESS OF OXIDIZING FABRICS.
APPLICATION FILED MAR. 13, 1905.
6 SHEETS—SHEET 2.
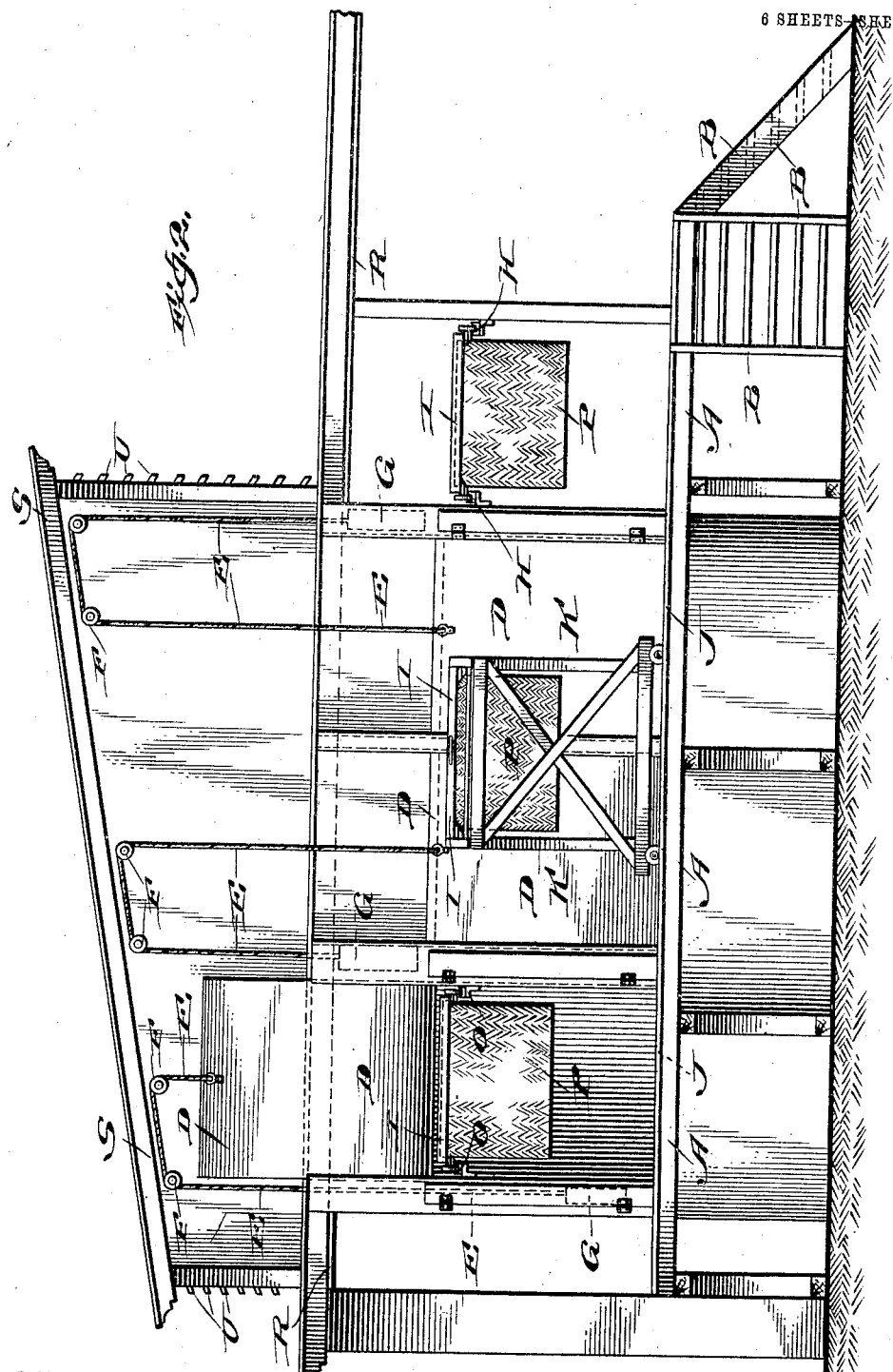
Witnesses
C. Mitchell
Rob't W. Ashley
Inventor
BERNHARD CLEFF
by
Dickerson, Brown, Raegener & Binney
att'ys

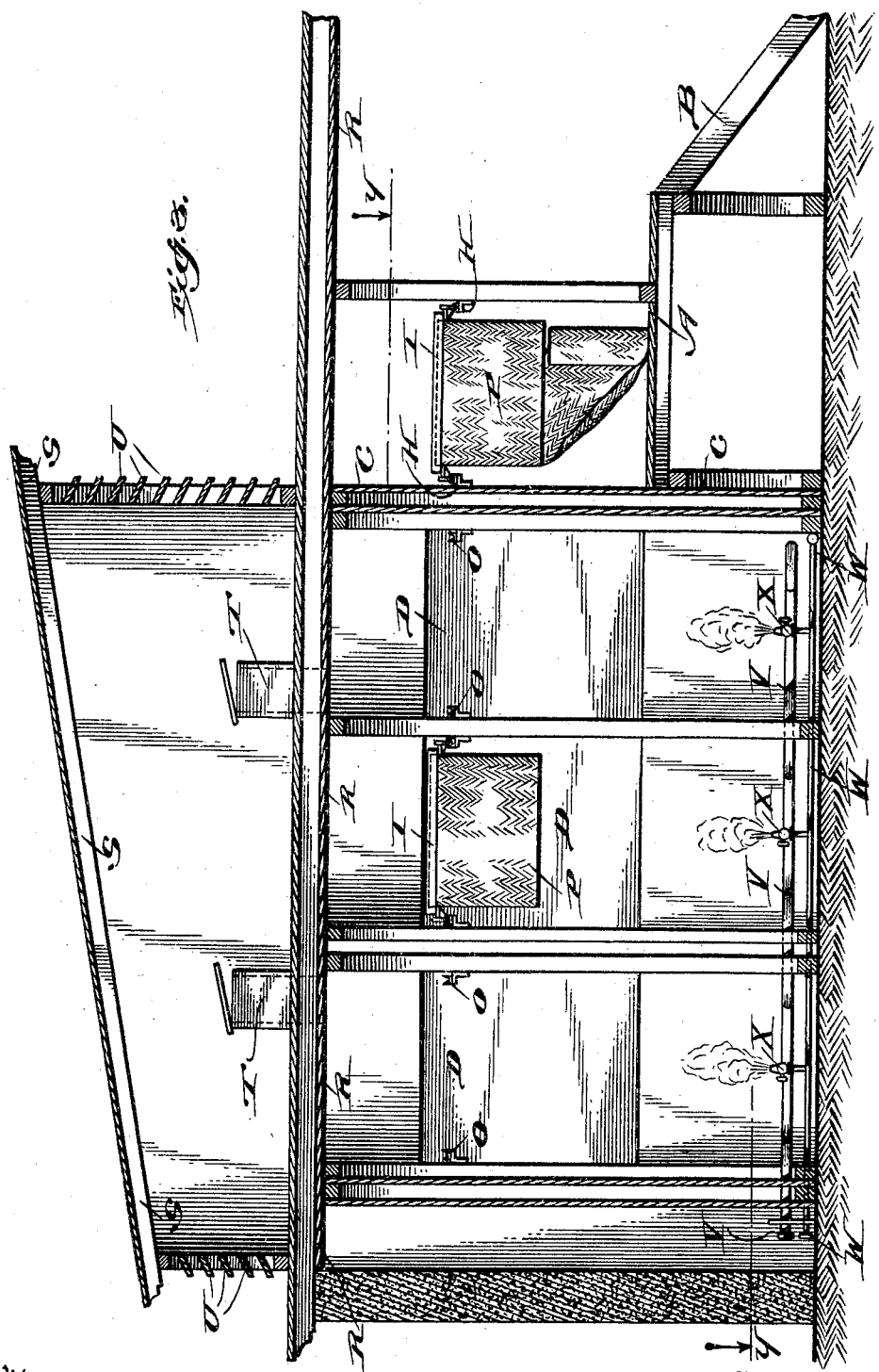

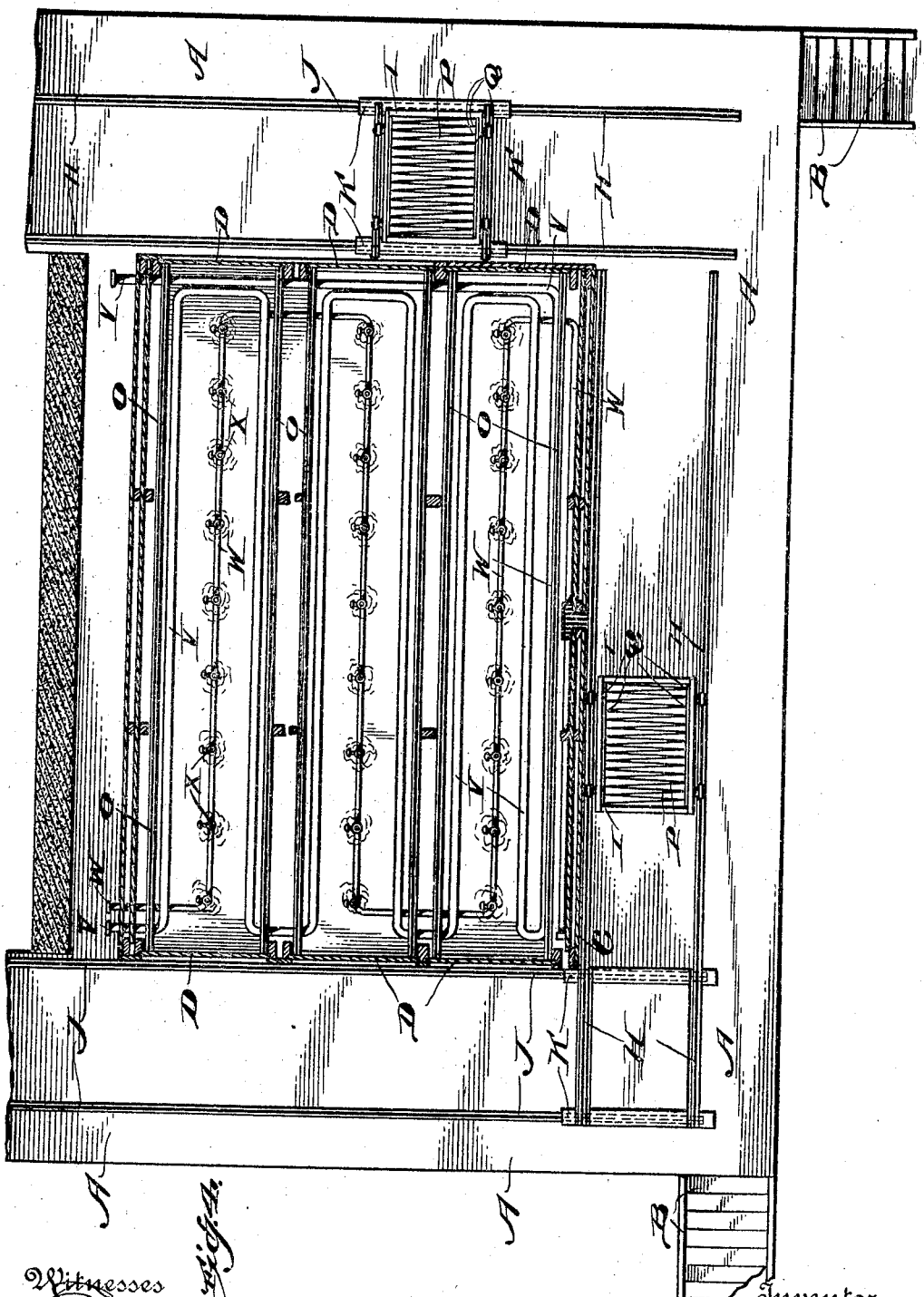

No. 810,394. PATENTED JAN. 23, 1906.
B. CLEFF.
PROCESS OF OXIDIZING FABRICS.
APPLICATION FILED MAR. 13, 1905.
6 SHEETS—SHEET 5.
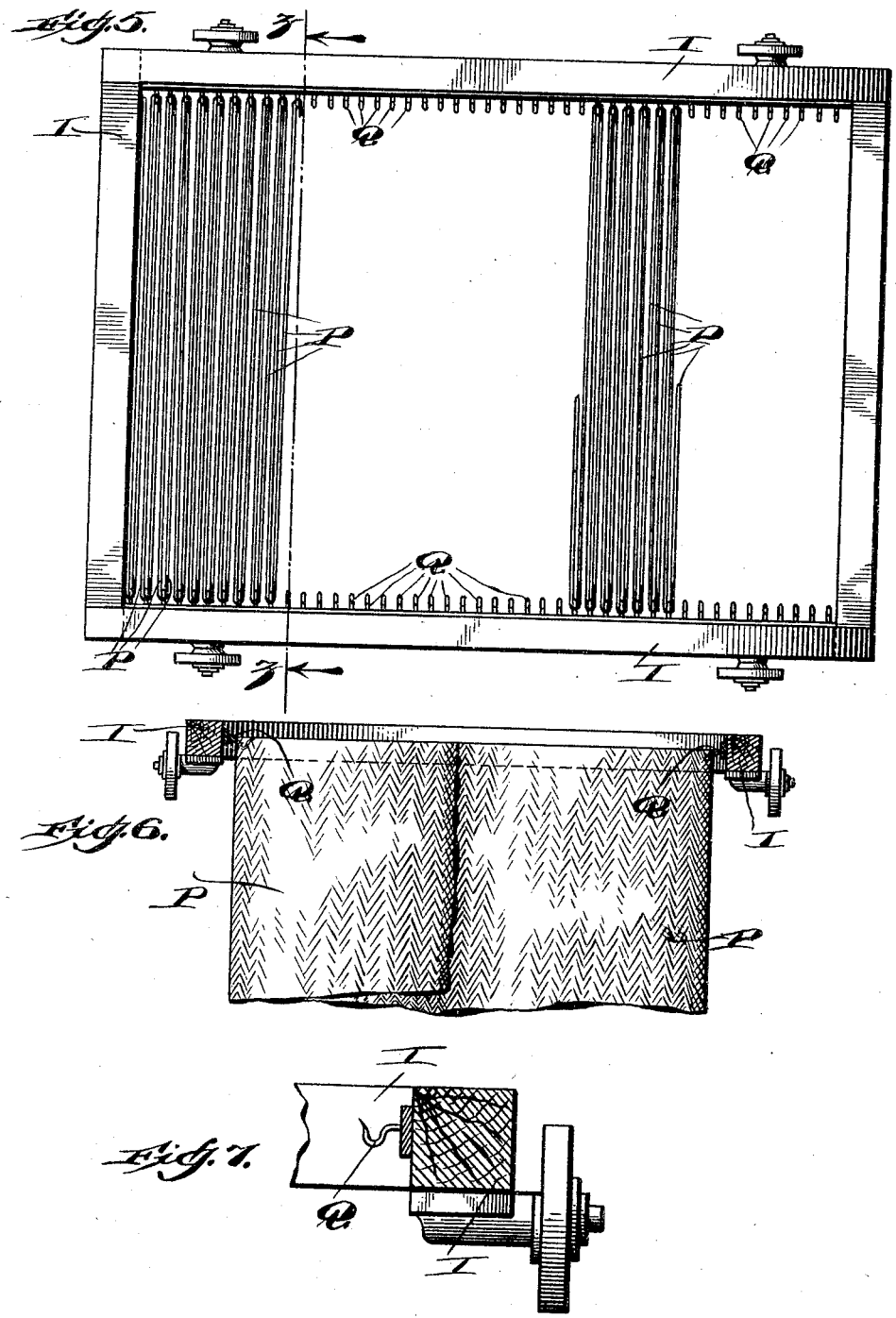
Inventor
BERNHARD CLEFF No. 810,394. PATENTED JAN. 23, 1906.
B. CLEFF.
PROCESS OF OXIDIZING FABRICS.
APPLICATION FILED MAR. 13, 1905.

6 SHEETS—SHEET 6.

Witnesses

Inventor
BERNHARD CLEFF
by
Dickerson, Brown, Raegener & Binney
attys

UNITED STATES PATENT OFFICE.

BERNHARD CLEFF, OF RAUENTHAL, NEAR BARMEN, GERMANY, ASSIGNOR TO SUSQUEHANNA SILK MILLS, OF NEW YORK, N. Y., A CORPORATION OF PENNSYLVANIA.

PROCESS OF OXIDIZING FABRICS.

No. 810,394. Specification of Letters Patent. Patented Jan. 23, 1906.

Application filed March 13, 1905. Serial No. 249,776.

*To all whom it may concern:*

Be it known that I, BERNHARD CLEFF, a subject of the German Emperor, and a resident of Rauenthal, near Barmen, Germany, have invented certain new and useful Improvements in Processes of Oxidizing Woven Materials, of which the following is a specification, accompanied by drawings.

This invention relates to a process of oxidizing woven materials; and the objects of the inventon are to increase the production of the oxidized material with a reduction of time required for the process, produce better and darker colors for the material, and prevent injury to the workmen during the carrying out of the process.

Further objects of this process will hereinafter appear; and to these ends the invention consists of the process for carrying out the above objects embodying the operations and steps substantially as hereinafter fully described and claimed in this specification and illustrated by appropriate apparatus in the accompanying drawings, in which—

Figure 1 is a side elevation of apparatus for carrying out the improved process. Fig. 2 is an end elevation. Fig. 3 is a transverse sectional view on the line x x of Fig. 1. Fig. 4 is a horizontal sectional plan view on the line y y of Fig. 3. Fig. 5 is a detail enlarged plan view of one of the carriages for the woven material. Fig. 6 is a transverse sectional view on the line z z of Fig. 5. Fig. 7 is an enlarged detail sectional view showing one of the wheels and one of the hooks for the carriage. Fig. 8 is a detail enlarged perspective view of the carriage with a strip of the woven material arranged on the hooks.

The woven material which is to be oxidized in the apparatus shown in the drawings is first saturated with suitable chemicals, which give an oxidizing reaction when heated, and the apparatus is provided with suitable means for heating the oxidizing-chamber. After the woven material has been chemically treated in any suitable manner and after the oxidation has been started in a suitable apparatus the chemically-treated material is subjected to my improved oxidizing process in the apparatus shown in the drawings.

Referring to the apparatus for carrying out this process, A represents a suitable platform provided with stairways B, leading thereto at each end. The platform is built around a suitable oxidizing-chamber or housing C, having continuous sides and sliding doors D at each end operated in any suitable manner, as by means of ropes E, running over pulleys F and connected to weights G. Arranged along one side of the oxidizing-chamber on the platform A are elevated tracks H, upon which a carriage I may travel. At each end of the oxidizing-chamber on the platform A are arranged tracks J, upon which traveling platforms K may be moved back and forth. These platforms are provided with portions of track L, adapted to coöperate with the track H at the sides of the oxidizing-chamber, so that when a traveling platform K is moved opposite the end of the track H the carriage I may be rolled onto the platform K, which may be then rolled along the track J until opposite one of the doors D at the end of the oxidizing-chamber.

The oxidizing-chamber is provided with longitudinally-extending elevated tracks O, adapted to coöperate with the portions of track L on the traveling platforms K, so that the carriage I may be rolled from the traveling platform K onto one of the tracks O in the oxidizing-chamber, at which place the material is subjected to the oxidizing process. The carriage is rolled into the oxidizing-chamber and the door D closed.

The carriages may be rolled into the house one after another and pushed through the oxidizing-chamber on the track O in a long line, so that the material is continuously subjected to the process in the oxidizing-chamber. The carriage I is thrust into the oxidizing-chamber at one end and removed from the other end through the sliding doors upon the traveling platform K, which travels on the tracks at that end of the chamber.

The chemically-treated material P is hung up vertically in layers very close together on suitable hangers provided upon the traveling carriage I. As shown in the detail drawings, the material P is arranged on the carriage I back and forth in continuously-extending vertical layers. Any suitable means may be provided upon the carriage I for maintaining the material in the required position, in this instance the hooks Q being provided along the inside surfaces of the sides of the carriage.

The oxidizing-chamber is provided with a roof R and a superstructure S, which communicates with the interior of the chamber through the ventilators T. The superstructure is vented to the outside air through the lattice-work U or by means of any other suitable provision. The oxidizing-chamber is heated by both dry and wet steam, so that the atmosphere within the chamber is both hot and moist. Any suitable provision of steam-piping may be provided, as shown. However, the piping V, which extends back and forth over the bottom of the chamber, provides dry-steam heat, while the piping W, which also extends back and forth over the bottom of the chamber, is provided with a number of cocks X, from which the steam is alowed to escape, thus moistening the atmosphere in the chamber.

Suitable thermometers Y and Z are provided, accessible from the outside of the chamber, by means of which the proper temperature is maintained during the process. The mean temperature of the drying-chamber should be from about 43° to 47° Réaumur or 128° to 138° Fahrenheit. One of the thermometers, Y, indicates the dry heat of the closed steam-coils, which may read, for instance, about 45° Réaumur or 133¼° Fahrenheit, while the other thermometer, Z, indicating the temperature of the steam in the other coils from which the steam escapes, may indicate about 35° Réaumur or 110¾° Fahrenheit. The process has been satisfactorily carried out under these conditions of temperature.

I am aware that woven materials which have been first chemically treated in a suitable manner and with suitable chemicals have been thereafter subjected to oxidizing processes in closed and heated chambers. Heretofore, however, the material has been hung lengthwise within the chamber by hand or else the material is run between rolls to oxidize it. In those cases in which the material is hung lengthwise in the chamber the workmen are obliged to enter the chamber, and while they are hanging the material the temperature of the chamber must be reduced, and even under these conditions the atmosphere within the oxidizing-chamber is very injurious to human life, so that workmen cannot remain within the chamber longer than a few minutes at a time. The hanging of the material by hand is therefore a slow and tedious process, and after the material is suitably arranged the temperature of the chamber must first be brought to the required degree for carrying out the oxidizing process, then continued at that temperature until the process is finished, and finally reduced again to enable the workmen to enter and remove the finished material with the least degree of injury to themselves. According to this invention the material is first treated with suitable chemicals which give an oxidizing reaction when heated, and after the oxidation has been started in a suitable apparatus the so-treated material is then subjected for a relatively short time to a high degree of temperature in a closed and initially-heated chamber, which is maintained at a constant initial high temperature from the beginning to the end of the operation, thereby obtaining substantially the same degree of oxidation throughout the reaction, and finally the oxidized material is removed from the chamber.

According to this invention workmen are not required to enter the oxidizing-chamber, and therefore the temperature may be maintained at a high point from the beginning to the end of the operation—that is, as stated, from about 128° to 138° Fahrenheit. By hanging the material vertically and in layers very close together the operation is greatly hastened and greatly improved results are obtained with a much more even degree of oxidation than has heretofore been obtained in any former process. By placing the vertical layers of the material close together the reaction is strengthened and the heat is concentrated between the closely-lying layers. According to the old process, in which workmen were obliged to enter the chamber, it has been found that six workmen required three-quarters of an hour to hang an amount of material equal to that which may be placed within my present oxidizing-chamber and subjected to the oxidizing process all at one time, which process is begun and finished within the space of one hour. Therefore according to my invention the material is completely treated and handled by one workman in a little more than the time required by six workmen to actually handle the material by hand. According to the old process also if the temperature in the chamber were maintained at a rather high degree it would be necessary to vary the temperature from time to time to permit the workmen to enter and remove the material and hang new material. This variation of temperature of course produces uneven degrees of oxidation, while according to my present invention the same even degree of oxidation over all the parts of the material is maintained from the beginning to the end of the process.

Obviously this process may be carried out in different ways and by different kinds of apparatus. I have shown and described one suitable form of apparatus for carrying out the process, and have described the process which embodies my invention; but Without specifying equivalents or variations in the process, I desire to obtain by Letters Patent the following:

The process substantially as herein described of oxidizing woven material, which has been treated with suitable chemicals giving an oxidizing reaction when heated, which consists in first saturating the said material and starting the oxidation in a suitable apparatus, then mechanically introducing the so-treated material, as it comes from the first apparatus, in a body all at once into a highly-heated and moist atmosphere in a closed chamber initially heated to a high degree, leaving said body of material in said chamber for a relatively short time while regulating the temperature to maintain the said initial high temperature of the chamber and substantially the same degree of moisture of the air therein from the beginning to the end of the operation, thereby obtaining substantially the same degree of oxidation throughout the reaction and finally mechanically removing the whole of said body of material at once from the chamber without substantially reducing the temperature of said chamber or altering the said degree of moisture of the air therein.

In testimony whereof I have signed this specification in the presence of two subscribing witnesses.

BERNHARD CLEFF.

Witnesses:
HELEN L. OBERTEUFFER,
A. L. O'BRIEN.